United States Patent [19]

Komai et al.

[11] Patent Number: 4,829,429

[45] Date of Patent: May 9, 1989

[54] ELECTRONIC CASH REGISTER

[75] Inventors: Kensaku Komai, Yamatokoriyama, Japan; Yoshiaki Imanishi, Paramus, N.J.

[73] Assignee: Sharp Kabushiki Kaisha, Osaka, Japan

[21] Appl. No.: 163,524

[22] Filed: Mar. 3, 1988

[30] Foreign Application Priority Data

Mar. 3, 1987 [JP] Japan ............................ 62-31611[U]

[51] Int. Cl.$^4$ ............................................... G07G 1/12

[52] U.S. Cl. ................................ 364/405; 200/61.61; 235/22

[58] Field of Search ...................... 364/405; 200/61.61; 235/22; 340/570–571

[56] References Cited

U.S. PATENT DOCUMENTS

| | | | |
|---|---|---|---|
| 2,858,066 | 10/1958 | Oyala | 235/22 |
| 3,036,298 | 5/1962 | Schiller | 200/61.61 |
| 4,035,792 | 7/1977 | Price | 340/570 |
| 4,070,564 | 1/1978 | Tucker | 364/405 |
| 4,237,483 | 12/1980 | Clever | 364/405 |
| 4,603,239 | 7/1986 | Ishii | 200/61.61 |
| 4,630,110 | 12/1986 | Cotton | 200/86 |
| 4,725,949 | 2/1988 | Dreher | 364/405 |

FOREIGN PATENT DOCUMENTS 0157743 9/1985 European Pat. Off. .

*Primary Examiner*—Jerry Smith
*Assistant Examiner*—Gail O. Hayes
*Attorney, Agent, or Firm*—Birch, Stewart, Kolasch & Birch

[57] ABSTRACT

Disclosed is an electronic cash register comprising an input unit including numeric keys to enter the numerical information such as price and function keys to enter a variety of transaction information, an internal processing circuit to process the numerical information entered by the input unit, an output unit to deliver numerical information entered by the input unit or numerical information processed by the internal processing circuit, a first memory to store the cumulative total values of the numerical information occurring from various transactions, a drawer to keep and store the cash, which is opened by an open command signal sent from the internal processing circuit at the end of various transactions, a timer to start timing in response to the open command signal of the drawer and to stop the timing action in relation to the closing action of the drawer, and a second memory to store a time information corresponding to the measured period by the timer according to the timing action of the timer.

3 Claims, 2 Drawing Sheets

ELECTRONIC CASH REGISTER

BACKGROUND OF THE INVENTION

This invention relates to an electronic cash register to register a variety of transaction information, and more particularly to an electronic cash register equipped with a function to check the opening status of a drawer in which cash is kept and stored.

In some of the conventional cash registers, opening of the drawer was notified by voice or sound for the purpose of prevention of burglary.

Such a system to indicate that the drawer is now open upon opening of the drawer as described above had a preventive effect against burglary, but it was noisy because the indicating action was carried out at every opening of the drawer even in an ordinary registering operation of transactions and, besides, it had a poor preventive effect against crimes of operators since it was a repetitive indicator.

SUMMARY OF THE INVENTION

It is hence a primary object of this invention to present an electronic cash register capable of recording the opening status of the drawer by monitoring the opening period of the drawer and checking the status depending on the record so as to enhance the preventive effect against the crimes of operators.

Other objects and further scope of applicability of the present invention will become apparent from the detailed description hereinafter. It should be understood however, that the detailed description of and specific examples, while indicating preferred embodiments of the invention, are given by way of illustration only, since various changes and modifications within the spirit and scope of the invention will become apparent to those skilled in the art from this detailed description.

To achieve the above objects, according to an embodiment of the present invention, an electronic cash register includes an input device having numeric keys to enter the numerical information such as price and function keys to enter a variety of transaction information, an internal processing device to process the numerical information entered by the input means, an output device to deliver numerical information entered by the input device or numerical information processed by the internal processing device, a first memory to store the cumulative total values of the numerical information occurring from various transactions, a drawer to keep and store the cash, which is opened by an open command signal sent from said internal processing means at the end of various transactions, a timer to start timing in response to the open command signal of the drawer and to stop the timing operation in relation to the closing action of the drawer, and a second memory to store time information corresponding to the measured period by the timer according to the timing operation of timer.

To describe another embodiment of the present invention, an electronic cash register includes a drawer to keep and store the cash, which is opened by an open command signal delivered from an internal processing unit after a transaction, a timer to start timing in response to the open command of the drawer and to stop the timing operation in relation to the closing action of the drawer, a counting circuit to count up every time the timer times a specified time, and a count keeping memory to register and keep the count of the counting circuit when the timer stops its timing operation and also to deliver the kept data to the printer when resetting or reading.

Accordingly, in an electronic cash register of the present invention, when an operator presses a tender key to command the end of a transaction after registering a variety of transaction information, an open command signal to open the drawer is delivered from the internal processing unit and the drawer opens, and at the same time, the timer is driven to start a timing operation in response to said open command signal. And every time the timer times a specified time, for example, thirty seconds, the counter counts up by one.

When payment and receipt of the cash related to the transaction are over, the operator closes the drawer. It follows that the timing action of the timer is stopped by the closing action, and the count of the counter at the time is registered in the memory. As a result, when resetting and reading of the register are carried out afterward, the counts in the memory are delivered to the printer, so that the opening status of the drawer can be checked by the counts.

A preventive effect against crimes of the operators is consequently exerted because the opening status of the drawer at every transaction can be recorded and checked, that is, the opening period of the drawer can be monitored.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE EMBODIMENT

Figure 1:
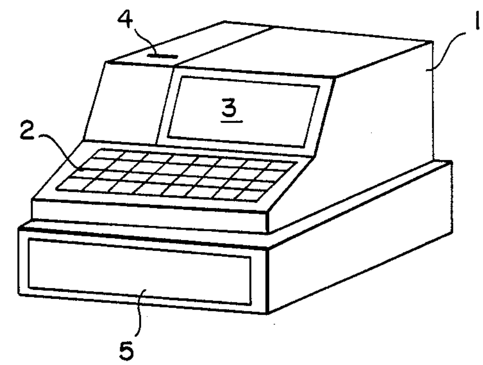
FIG. 1 is a perspective view showing the appearance of an electronic cash register according to the present invention.
Figure 2:
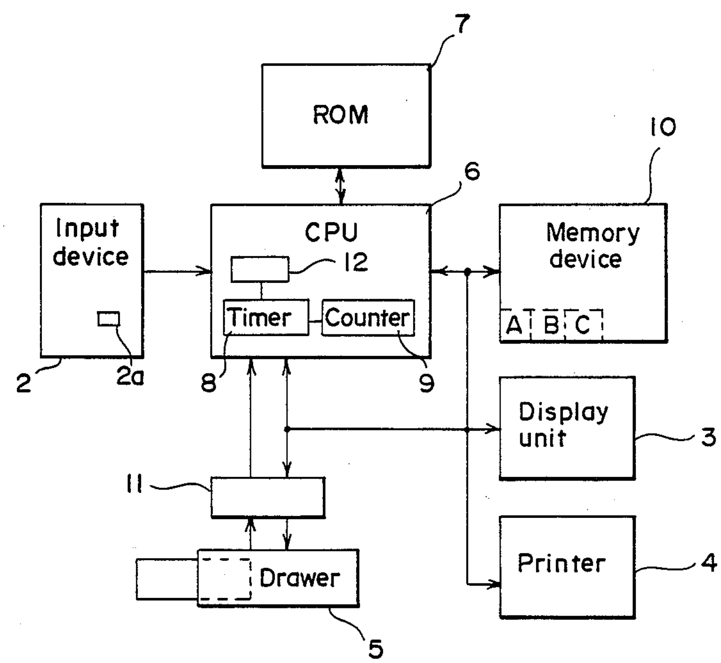
FIG. 2 is a block diagram showing a control structure of the electronic cash register of this invention.

FIG. 1 is an outline view of an electronic cash register of an embodiment according to the present invention, in which numeral 1 is a cash register main body, 2 is an input unit including numeric keys to enter numerical information such as price and function keys to enter a variety of transaction information, which is installed on a front face of the main body 1, 3 is a display unit to deliver the input information from the input unit 2 and numerical information processed in an internal processing unit shown in FIG. 2, 4 is a printer to issue receipts and journal corresponding to each transaction, and 5 is a drawer to keep and store cash and others, which is opened in response to an open command signal from the internal processing unit after the end of the transaction. The input unit 2 is equipped also with a tender key to specify the end of a transaction and a key to register the operators (clerks) who operate the cash register.

Next, FIG. 2 is a block diagram showing a control structure of the register. Identical parts in FIG. 1 and FIG. 2 are shown by identical reference numerals, respectively.

In FIG. 2, numeral 6 is an internal processing unit (CPU) to process the information entered from the input unit 2 according to programs preliminarily stored in ROM 7, and the CPU 6 includes a timer 8 to time the opening period of the drawer 5 and a counter 9 to count up by one at every desired period in this timer 8. Besides, the CPU 6 calculates or transfers entered numerical information signals.

Numeral 10 is a memory device (RAM) to store date processed in the CPU 6, that is, cumulative values of numerical information such as prices occurring in a variety of transactions, and the memory device 10 is composed of certain areas to store opening status information of the drawer 5, that is to say, memory areas A, B, C . . . to keep counts in said counter 9. These memory areas A, B, C . . . are allocated to the clerks (A, B, C . . . ) of the register respectively.

Numeral 11 is an opening control unit of the drawer 5, which opens the drawer 5 responding to the open command signal from the CPU 6 and also sends a close command signal to the CPU 6 side when the drawer is closed.

In the ROM 7, programs to sum up numerical information such as price on each transaction, or the like and preliminarily stored, and the contents of the ROM 7 are identical to those in conventional electronic cash registers.

The CPU 6 is also equipped with an input discriminating circuit 12 to judge the signals entered from the input unit, and when a key to specify an end of various transactions 2*a*, for example, a tender key such as a total or amount tender key, is judged to be pushed by the discriminating circuit, the CPU 6 starts the closing operation of the transaction and at the same time delivers a drawer open command to a drawer control unit 11. The drawer control part 11, upon receiving the signal, automatically opens the drawer 5. On the other hand, the CPU 6 delivers operation start signals to the timer 8 and the counter 9 simultaneously with the output of the drawer open command signal. Responding to the operation start signals, the timer 8 starts timing and the counter 9 counts up by one at every desired period clocked by the timer 8. At this point, the operation start signal is delivered synchronously with the drawer open command signal. If the key 2*a* to specify the end of transactions is not judged to be pressed in the discriminating circuit 12, neither the drawer open command signal nor the operation start signal is delivered from the CPU 6.

To close the drawer 5, to the contrary, the drawer 5 is closed when it is pressed up to the closing position by the clerk (operator) of the cash register, and when the closing action finishes, the drawer opening control unit 11 transfers a closed signal to the CPU 6. By receiving the closed signal, the timer 8 is reset to put an end to the timing action. The count of the counter 9 is stored in a memory area for the present clerk (operator) in the memory device 10. Then the content of the counter 9 is reset.

In the memory device (RAM) 10, cumulative values of the numerical information such as price appearing in each transaction are stored, but in addition, it is also possible to store the transaction data on each transaction, that is, all of the numerical information occurring in the transaction such as prices.

Referring to the selection of the memory area for storing the calculated values of the counter 9 of the memory device (RAM) 10, a memory area is specified for each clerk (operator) when an operator preliminarily enters his or her code number or presses an operator register key from the input unit 2 at the beginning of using the cash register.

On the display unit 3, numerical information entered by the clerk (operator) of the cash register such as prices and cumulative values of the numerical information are displayed at every transaction.

The printer 4 is used to issue receipts and journal corresponding to the transaction. For example, numerical information such as prices are printed out every time the clerk (operator) enters the information. And when the operator specifies the end of the transaction in order to pay or receive the cash with the customer by operating, for example, a tender key such as a total or amount tender key, the total is calculated by the CPU 6 and the cumulative numerical value information is printed out. In such a way, receipt and journal corresponding to a transaction are issued.

Figure 3:
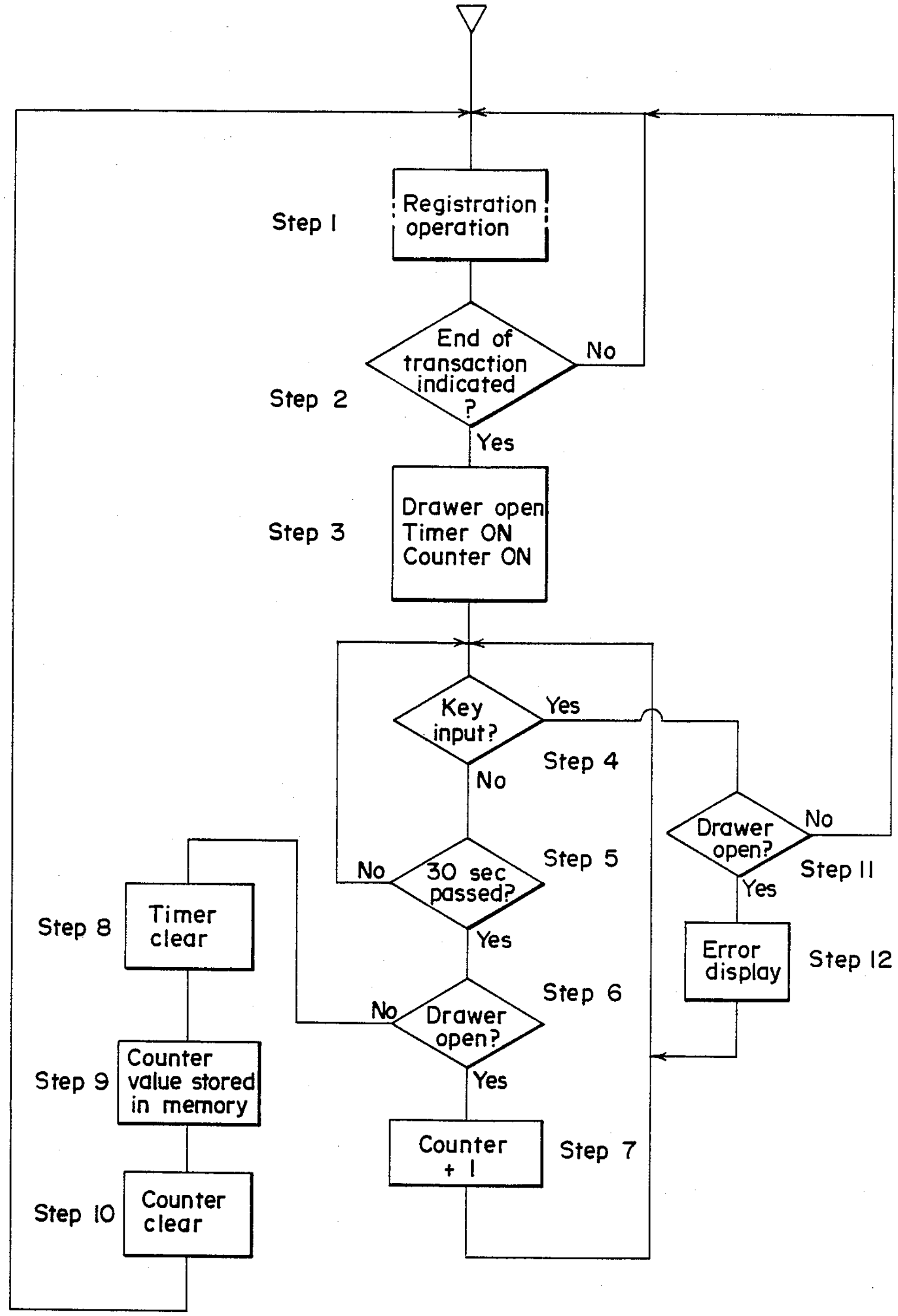
FIG. 3 is a flowchart showing the operations of the electronic cash register of this invention.

FIG. 3 is a flowchart showing practical operations of FIG. 2, and the operation of the cash register of this invention is explained by referring to FIG. 3. The registering operation of various transactions are carried out through the input unit 2, CPU 6, memory device 10, and display unit 3, and as they are similar to those required in general cash registers, their explanation is omitted here.

It is assumed here that clerk (operator) A to use the cash register preliminarily registers the operator A, and that the memory area A in the memory device 10 is specified. When a series of transaction entries of a customer ends and the operator (A) specifies the end of the transaction, for example, operates the tender key such as a total or amount tender key, the instruction is sent from the input unit 2 to the CPU 6 and the CPU 6 calculates the total of the transaction and also delivers the open command signal to the opening control unit 11 of the drawer 5. The timer 8 in the CPU 6 is additionally driven to start timing in response to the output of the open command signal.

The opening control unit 11 opens the drawer 5 responding to the open command signal, while the timer 8 starts timing synchronously with the opening of the drawer 5.

The timer 8 delivers a signal to the counter 9 every time the desired period, for example, thirty seconds is counted and the counter 9 counts up by one.

On the other hand, when the payment of the cash by the customer ends, the operator A closes the drawer 5. When the drawer is closed, the opening control unit 11 delivers the closed signal to show that the drawer 5 is closed to the CPU 6, the CPU 6 sequentially clears the timer 8 responding to the closed signal, terminates the clocking action, and at the same time, registers the count of the counter 9 in the memory area A in the memory device 10, and clears the data in the counter 9.

In this memory area A, the opening status information showing how long the operator A opens the drawer 5 at each transaction is kept and sorted one after another.

Describing further details, in step 1, a series of transaction entries for a customer is carried out and when the transaction registration ends, the operator (A) operates the key 2*a* to specify the end of the transaction.

In step 2, whether the key 2*a* to specify the end of the transaction is operated or not is judged and if it is judged not to be operated, the transaction registration in step 1 is resumed. If the key 2*a* to specify the end of the transaction is judged to be operated, the operation advances to step 3, where the CPU 6 delivers an open command signal to the drawer opening control unit 11 and furthermore delivers the action start signals to the timer 8 and the counter 9 synchronously with the command signal. The drawer opening control unit 11 opens the drawer 5 in response to the open command signal.

The timer 5 begins timing in response to the operation start signal and delivers a signal to the counter 9 every time the desired period, for example, thirty seconds is measured to let the counter 9 count up by one (steps 5, 7).

In step 4, whether any key is entered after the drawer 5 opens or not is judged by the input discriminating circuit in the CPU 6, and if any input is found, the opening status of the drawer 5 is checked again in step 11. When the drawer 5 is judged to be closed at step 11, the operation returns to the transaction entry in step 1. To the contrary, when the drawer 5 is judged to be opened, an error message (key input error) is displayed and the operation returns to step 4.

If no key is judged to be entered at step 4, the operation advances to step 5, where the CPU 6 judges whether the desired period (30 seconds in this embodiment) passes or not after the timer 8 has started timing.

In step 6, whether the drawer 5 is closed after the timer has started timing or not is judged by the drawer control unit 11.

In step 7, if the drawer 5 is still open when the desired period (for example, 30 seconds) passes by the according to the timer 8, the timer 8 delivers a signal to let the counter 9 count up by one.

When the drawer 5 is judged to be closed in step 6, the operation advances to step 8, where the timer 8 is cleared. The count of the counter 9 is, sequentially in step 9, stored in the memory area A for the present clerk (operator) A. When the storing ends, the data in the counter 9 is reset in step 10.

The information kept in each memory area such as memory areas A, B and C is delivered and printed at the printer 4 on a receipt and journal at the time of reset or read. By referring to the delivered record, the opening period status of the drawer in transaction operation on each operator can be checked.

In delivering the information kept in the memory areas A, B, C, the content on each transaction and the information in the memory area at that time may be delivered in pairs when reading or resetting the cash register.

Furthermore, it may be designed to give an alarm outside or to shut the drawer automatically when the count of the counter 9 reaches or exceeds a desired value.

As described above, the electronic cash register of this embodiment comprises a drawer to keep and store the cash, which is opened by an open command signal delivered from an internal processing unit after a transaction, a timer to start timing in response to the open command of the drawer and to stop the timing action in relation to the closing action of the drawer, a counting circuit to count up every time the timer clocks a specified time, and a count keeping memory to register and keep the count of the counting circuit when the timer stops its timing action and also to deliver the kept data to the printer when resetting or reading.

In the above electronic cash register, when an operator presses a tender key to command the end of a transaction after registering a variety of transaction information, an open command signal to open the drawer is delivered from the internal processing unit and the drawer opens, and at the same time, the timer is driven to start the timing action in response to the open command signal. And every time the timer clocks a specified time, for example, thirty seconds, the counter counts by one.

When payment and receipt of the cash related to the transaction are over, the operator closes the drawer. It follows that the timing action of said timer is stopped by the closing action, and the count of the counter at the time is registered in the memory. As a result, when resetting and reading of the register are carried out afterward, the counts in the memory are delivered to the printer, so that the opening status of the drawer can be checked by the counts.

In this invention, the opening status of the drawer 5 is recorded by using the timer 8 and the counter 9, but it is also possible to measure the opening period of the drawer 5, to store time information corresponding to the opening period in the memory and to deliver them whenever they are required. Or it may be also designed to measure the period that the drawer is open and to store the opening period of the drawer.

As explained above, in the electronic cash register according to this invention, the opening status of the drawer at every transaction can be recorded to be checked, that is to say, the opening period of the drawer can be monitored, so that a preventive effect against crimes of operators can be exerted.

While only certain embodiments of the present invention have been described, it will be apparent to those skilled in the art that various changes and modifications may be made therein without departing from the spirit and scope of the present invention as claimed.

What is claimed is:

1. An electronic cash register comprising:

input means including numeric keys to enter the numerical information such as a price and function keys to enter a variety of transaction information;

internal processing means to process the numerical information entered by said input means;

output means to deliver numerical information entered by said input means or numerical information processed by said internal processing means:

a first memory to store the cumulative total values of the numerical information occurring from various transactions;

a drawer to keep and store the cash, which is opened by an open command signal sent from said internal processing means at the end of various transactions;

timer means to start a timing action in response to said open command signal of the drawer and to stop said timing action in relation to the closing action of the drawer; and a second memory to store a time information corresponding to the measured period by said timer means according to the timing action of said timer means.

2. An electronic cash register comprising:

an input unit including numeric keys to enter numerical information such as prices and function keys to enter a variety of transaction information;

an internal processing unit to calculate and transfer numerical information signals;

a display unit and a printer to deliver the entered or internally processed numerical information;

a first memory to store cumulative values of the numerical information appearing in a variety of transactions such as prices;

a drawer to keep and store the cash, which is opened by an open command signal from said internal processing unit;

a timer to start a timing action in response to said drawer open command signal and also to stop said timing action in relation to the closing action of the drawer; and a second memory to keep and store the information corresponding to the timed period of said timer sequentially to the end of the timing action of said timer and also to deliver the stored data at the printer when resetting or reading.

3. An electronic cash register comprising:

an input unit including numeric keys to enter numerical information such as prices and function keys to enter a variety of transaction information;

an internal processing unit to calculate and transfer numerical information signals;

a display unit and a printer to deliver the entered or internally processed numerical information;

a first memory to store cumulative values of the numerical information appearing in a variety of transactions such as prices;

a drawer to keep and store the cash, which is opened by an open command signal from said internal processing unit;

a timer to start a timing action in response to said drawer open command signal and also to stop said timing action in relation to the closing action of the drawer;

a counting circuit to count up every time said timer measures a desired period; and a count keeping memory to enter and store the count of said counting circuit at the end of the timing action of said timer and to deliver the stored data to said printer when resetting or reading.

* * * * *